United States Patent
Lanau et al.

(10) Patent No.: US 10,160,859 B2
(45) Date of Patent: Dec. 25, 2018

(54) THERMOPLASTIC COMPOSITION COMPRISING A POLYAMIDE AND A POLYSILOXANE

(71) Applicant: Henkel AG & Co. KGaA, Duesseldorf (DE)

(72) Inventors: Sebastien Lanau, Milan (IT); Giorgio Zaffaroni, Suno (IT); Luca Marchese, Arese (IT); Sebastiano Moscardin, Dorno (IT)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/613,782

(22) Filed: Jun. 5, 2017

(65) Prior Publication Data
US 2017/0267862 A1 Sep. 21, 2017

Related U.S. Application Data

(63) Continuation of application No. PCT/EP2015/076944, filed on Nov. 18, 2015.

(30) Foreign Application Priority Data

Dec. 18, 2014 (EP) .................... 14198766

(51) Int. Cl.
| | | |
|---|---|---|
| *C08L 77/00* | (2006.01) | |
| *C08L 83/06* | (2006.01) | |
| *C09J 183/06* | (2006.01) | |
| *C08K 5/5419* | (2006.01) | |
| *C08L 77/08* | (2006.01) | |
| *C08K 3/36* | (2006.01) | |
| *C08L 77/02* | (2006.01) | |
| *C09J 177/00* | (2006.01) | |
| *C09D 183/06* | (2006.01) | |
| *C08L 77/06* | (2006.01) | |
| *C09D 177/00* | (2006.01) | |

(52) U.S. Cl.
CPC ............ *C08L 77/00* (2013.01); *C08K 5/5419* (2013.01); *C08L 77/08* (2013.01); *C08L 83/06* (2013.01); *C09J 183/06* (2013.01); *C08K 3/36* (2013.01); *C08L 77/02* (2013.01); *C08L 77/06* (2013.01); *C09D 177/00* (2013.01); *C09D 183/06* (2013.01); *C09J 177/00* (2013.01)

(58) Field of Classification Search
CPC .......... C08L 77/00; C08L 77/02; C08L 77/06; C08L 77/08; C08L 83/06; C09D 177/00; C09D 177/02; C09D 177/06; C09D 177/08; C09D 183/06; C09J 177/00; C09J 177/02; C09J 177/06; C09J 177/08; C09J 183/06

USPC ........................................................ 525/431
See application file for complete search history.

(56) References Cited

U.S. PATENT DOCUMENTS

| | | | | |
|---|---|---|---|---|
| 5,436,099 A | * | 7/1995 | Schank | G03G 5/047 430/132 |
| 6,153,691 A | * | 11/2000 | Gornowicz | C08L 23/06 524/861 |
| 6,353,052 B1 | * | 3/2002 | Jones | C08G 69/04 524/731 |
| 6,465,552 B1 | | 10/2002 | Chorvath et al. | |
| 9,657,199 B2 | * | 5/2017 | Greer | C09J 11/08 |
| 2002/0091205 A1 | | 7/2002 | Brewer et al. | |

FOREIGN PATENT DOCUMENTS

| | | |
|---|---|---|
| CN | 103571386 A | 2/2014 |
| EP | 0204315 A2 | 12/1986 |
| EP | 0749463 B1 | 5/1998 |

OTHER PUBLICATIONS

International Search Report for International PCT Patent Application No. PCT/EP2015/076944 dated Jan. 27, 2016.

\* cited by examiner

*Primary Examiner* — Marc S Zimmer
(74) *Attorney, Agent, or Firm* — James E. Piotrowski

(57) ABSTRACT

A thermoplastic composition which comprises at least one polyamide, which preferably has a melting point of less than 185° C., and at least one liquid polysiloxane compound which preferably has a viscosity of 750 to 100,000 mPas at 25° C. and is OH terminated, wherein the thermoplastic composition is obtainable by a process comprising the steps:
 1a) heating the at least one polyamide to a temperature above the melting point of the at least one polyamide and preferably below 185° C.;
 2a) adding under stirring
   the at least one liquid polysiloxane compound
   to the heated compound(s) of step 1a), wherein the temperature is kept above the melting point of the at least one polyamide and preferably below 185° C.; and
 3a) mixing the obtained mixture of step 2a) preferably at 80° to 180° C., more preferably 110 to 140° C.
Use of this the thermoplastic composition according to the present invention in sealants, adhesives, or as rheological modifier or surface modifier. Furthermore, to a hot melt adhesive comprising the thermoplastic composition according to the present invention. And use of this hot melt in vehicle parts, constructions, windows, glazing, sanitary applications, fittings, roofing, plumbing, appliance application and bonding of panes.

17 Claims, No Drawings

THERMOPLASTIC COMPOSITION COMPRISING A POLYAMIDE AND A POLYSILOXANE

The present invention relates to a thermoplastic composition which comprises at least one polyamide and at least one liquid polysiloxane compound, which is obtainable by a specific process as defined below. Furthermore, the present invention relates to the use of this thermoplastic composition in sealants, adhesives or as a rheological modifier or surface modifier. Furthermore, a hot melt adhesive comprising the specific thermoplastic composition and the use of this hot melt in in vehicle parts, constructions, windows, glazing, sanitary applications, fittings, roofing, plumbing, appliance application and bonding of panes is also part of the invention.

Common silicone sealants do not have the capability to keep the substrates to be sealed together before the silicone sealant is cured. In order to ensure a more accurate sealing with silicone sealants it was an object of the invention to provide adhesives which have the properties of a common silicone sealant but additionally have the capability to keep the substrates to be bonded together before curing.

The present inventors have surprisingly found that with the specific thermoplastic compositions of the present invention hot melt adhesives can be obtained, which show characteristics of a standard silicone sealant and have a high green strength of a standard hot melt.

In particular the present invention relates to a thermoplastic composition which comprises at least one polyamide, which preferably has a melting point of less than 185° C., and at least one liquid polysiloxane compound which preferably has a viscosity of 750 to 100,000 mPa.s at 25° C. and is OH terminated, wherein the thermoplastic composition is obtainable by a process comprising the steps:

1a) heating the at least one polyamide to a temperature above the melting point of the at least one polyamide and preferably below 185° C.;

2a) adding under stirring the at least one liquid polysiloxane to the heated compound(s) of step 1a), wherein the temperature is kept above the melting point of the at least one polyamide and preferably below 185° C.; and 3a) mixing the obtained mixture of step 2a) preferably at 80° to 180° C., more preferably 110 to 140° C.

Use of the thermoplastic composition according to the present invention in sealants, adhesives, or as rheological modifier or surface modifier.

A hot melt adhesive comprising the thermoplastic composition according to the present invention.

Use of the hot melt adhesive according to the present invention in vehicle parts, constructions, windows, glazing, sanitary applications, fittings, roofing, plumbing, appliance application and bonding of panes.

Further preferred embodiments are set out in the claims. In the present specification, the terms "a" and "an" and "at least one" are the same as the term "one or more" and can be employed interchangeably.

Unless otherwise indicated the measurement methods described in the "Examples and measurement method" section below are employed in the present invention.

The polyamides can be prepared from different monomers. Preferably, the molecular weight is selected so that a polyamide is obtained which can be processed as melt at temperatures below 250° C. The polyamides can be obtained by employing an acid component which can be selected from dicarboxylic acids and polymeric fatty acids or combinations thereof and can also include further tricarboxylic acids, and a diamine component as starting materials. Polyamides and their preparation are generally known to the skilled person. Preferably acid terminated polyamides are employed, more preferably linear acid terminated polyamides.

Examples for suitable dicarboxylic acids include C4 to C60 dicarboxylic acids, especially adipic acid, azelaic acid, succinic acid, dodecanedioic acid, glutaric acid, suberic acid, maleic acid, pimelic acid, sebacic acid, undecanedioic acid or aromatic dicarboxylic acids, e.g. terephthalic acid, phthalic acid, isophthalic acid or mixtures of these dicarboxylic acids. The dicarboxylic acids are well known in the art and commercially available. Polymeric fatty acids are suitable as well. The polymeric fatty acids, sometimes referred to in the literature as "dimer acids", are complex mixtures resulting from the polymerization of fatty acids. These polymeric fatty acids are obtained by coupling unsaturated long chain monobasic fatty acids, e.g. linolenic acid or oleic acid. A mixture of polymeric fatty acids can be employed as well and are those commercially available from the polymerization of tall oil fatty acids. These polymeric fatty acids preferably have the following typical composition: C18 monobasic acids (monomer) about 0 to 5% by weight, C36 dibasic acids (dimer) 60 to 95% by weight, sometimes up to about 98% by weight, C54 and higher polybasic acids (trimer) about 1 to 35% by weight, based on the total weight of the composition. The relative ratios of monomer, dimer and trimer in the polymeric fatty acids depend on the nature of the starting material, the conditions of polymerization and the degree of purification. Purer grades of polymeric fatty acids are obtained by distillation and contain at least 70%, preferably 80% and frequently up to 95% or even 98% by weight of dimeric fatty acid. The polymeric fatty acids may be unhydrogenated or hydrogenated.

As minor parts also monocarboxylic acids or tricarboxylic acids can be used, but cross-linked polyamides shall preferably be avoided. In addition to the polymeric fatty acids, the acids component may contain C4 to C12 dicarboxylic acids.

In preferred embodiments the carboxylic acid component of the polyamide may contain about 20 to 99 mol % of polymeric fatty acid and about 1 to 80 mol % of at least one C4 to C12 dicarboxylic acid, preferably this mixture contains about 30 to 95 mol % of polymeric fatty acid and about 5 to 70 mol % of the C4 to C12 dicarboxylic acids.

The diamine component is preferably selected from one or more aliphatic diamines, more preferably with an even number of carbon atoms, wherein the amine groups are preferably at the ends of the carbon chains. Aliphatic diamines can comprise 2 to 20 carbon atoms, wherein the carbon chain can be linear or slightly branched. Specific examples are 1,2-ethylenediamine, 1,3-diaminopropane, diethylenetriamine, dipropylenetriamine, 1,4-diaminobutane, 1,3-diaminopentane, methylpentanediamine, 1,6-hexamethylene diamine, trimethyl-hexamethylenediamine, 2-(2-aminomethoxy)ethanol, 2-methylpentamethylenediamine, 1,8-diaminooctane, neopentanediamine, diaminodipropylmethylamine, 1,12-diaminododecane. The particularly preferred aliphatic diamines are C4 to C12 diamines with an even number of carbon atoms. Another group of diamines is derived from polymeric fatty acids, as described above, which comprise primary amine groups instead of the carboxyl groups.

The diamine components can also comprise cyclic diamines or heterocyclic diamines such as for example 1,4-cyclohexanediamine, 4,4'-diamino-dicyclohexylmethane, piperazine, cyclohexane-bis-(methylamine), isophorone diamine, dimethyl piperazine, dipiperidyl propane, norbornane diamine, m-xylylenediamine or mixtures thereof. The number average molecular weight of such cyclic diamines is preferably between 80 g/mol to about 300 g/mol. In addition, the amino component may contain polyoxyalkylene diamines, such as polyoxyethylene diamine, polyoxypropylene diamine or bis-(diaminopropyl)-polytetrahydrofuran. The polyoxyalkylene diamines are commercially available under the tradename "Jeffamines" (Huntsman Co.). Their number average molecular weight is preferably between 200 and 4,000 g/mol, more preferably between 400 and 2,000 g/mol, based on the total amount of the diamine component. The number average molecular weight of the diamine compounds is determined via GPC using polysterene as reference.

The diamine component comprises preferably 20 to 85 mol % of the even numbered aliphatic diamines and 0 to 70 mol % of the cyclic diamine and 0 to 60 mol % of the polyoxyalkylene diamine, whereby at least one of the cyclic diamine or the polyoxyalkylene diamine is present in the amine component mixture.

The polyamide resins according to the invention may be prepared by conventional condensation methods and the acid groups to amine groups of the starting materials are present in approximate stoichiometric quantities. In the majority of cases, it is preferred that residual acid groups or residual amino groups be present after the condensation, more preferred are residual acid groups. To achieve this, an excess of acid groups or amine groups of the starting materials of no more than 10 equivalent % of all functional groups is used. Instead of the free carboxylic acids, their corresponding methyl-, ethyl- or propyl-ester may be used in the condensation reaction. The melt viscosity of the polyamide-composition may be controlled by adding a small amount of a monofunctional carboxylic acid like stearic acid.

The polyamide may contain additionally aminocarboxylic acids or the cyclic derivatives thereof with 5 to 18 carbon atoms in an amount up to 10 mol %. Examples of such components include 6-aminohexanoic acid, 11-aminoundecanoic acid, ω-laurolactam and ε-caprolactam.

When choosing the monofunctional, difunctional or trifunctional raw materials as monomers, the amount shall be selected so that preferably meltable, for example uncrosslinked polyamides shall be obtained. For example, if crosslinking/gelling occurs, then lowering the fraction of trifunctional components and/or increasing the content of monofunctional amines or fatty acids can result in polymers that do not tend to gel.

Examples of suitable polyamides based on dicarboxylic acids and polyether diamines are described in EP 749 463 A. Another type of suitable polyamides based on dimer fatty acids and polyamines is disclosed in EP 204 315 A.

For example further useful polyamides are based on dimer fatty acid-free polyamides containing polyether diamines. They can be manufactured from 40 to 50 mol %, preferably 50 mol %, of one or more C4 to C18 dicarboxylic acid(s), 5 to 45 mol %, preferably 15 to 40 mol % of at least one aliphatic diamine, 5 to 40 mol %, preferably 20 to 30 mol %, of one or more cycloaliphatic diamines, 0 to 40 mol %, preferably 5 to 25 mol % of polyether diamines, wherein the sum of the added diamines and the dicarboxylic acids each is 50 mol %, such that dicarboxylic acid components and diamine components are present in approximately equivalent molar fractions. In each case the sum of all carboxylic acid and of all amine shall add to 100 mol %.

The at least one polyamide according to the present invention has preferably a melting point of less than 185° C., more preferably of 10 to 180° C., most preferably 30 to 170° C. Furthermore, the softening point is preferably 50 to 200° C., more preferably 60 to 150° C., most preferably 70 to 90° C. The viscosity is preferably 250 to 100,000 mPa.s at 80° C., more preferably 500 to 50,000 mPa.s at 80° C., most preferably 1,000 to 20,000 mPa.s at 80°.

If more than one polyamide is contained in the thermoplastic compositions then the temperature in step 1a) should be above the melting point of the polyamide which has a higher melting point. For example, if the thermoplastic composition comprises a polyamide having a melting point of 100° C. and a second polyamide having a melting point of 120° C. then the temperature in step 1a) should be above 120° C.

The at least one polyamide is preferably present in 25 to 70% by weight, more preferably 30 to 60% by weight, most preferably 40 to 55% by weight, based on the total weight of the thermoplastic composition.

The liquid polysiloxane compound has preferably a viscosity from 750 to 100,000 mPa.s at 25° C. More preferably it is a hydroxyl terminated diorganopolysiloxane compound and has a viscosity from 750 to 100,000 mPa.s at 25° C.

The liquid polysiloxane is preferably a diorganopolysiloxane, whereby more preferably the organic groups are selected from methyl, ethyl, propyl, phenyl and vinyl radicals or combinations thereof. For example, the diorganopolysiloxane may be chosen from, in a non-limiting manner, a polydimethylsiloxane, an ethylmethyl polysiloxane, alkyl dimethicones, polyphenylmethylsiloxanes, such as phenyl dimethicones, phenyl trimethicones and vinyl methyl methicones, a copolymer of dimethylsiloxane and of methylvinylsiloxane, and mixtures of such polymers and copolymers, which are preferably hydroxyl terminated. In preferred embodiment, the diorganopolysiloxanes is linear. In more preferred embodiments, the diorganopolysiloxane is a polydimethylsiloxane, most preferably being OH terminated.

In preferred embodiments of the present invention, the liquid polysiloxane compound has a number average molecular weight ranging from 500 to 800,000 g/mol, more preferably from 5,000 to 700,000 g/mol, and most preferably from 50,000 to 600,000 g/mol.

Exemplarily compounds of the liquid polysiloxane compounds are of formula (I):

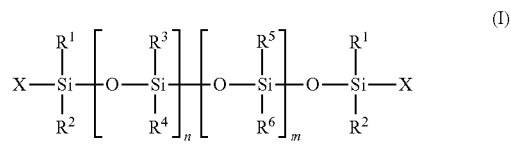

wherein:
$R^1$ to $R^6$ are independently selected from substituted or unsubstituted alkyl groups, vinyl groups, or aryl groups, more preferably from unsubstituted C1 to C6 alkyl groups, most preferably $R^1$ to $R^6$ are $CH_3$;
X is either hydroxyl groups or NCO groups, more preferably X is hydroxyl; and n and m are integers and at least 1, more preferably the sum of n+m is at least 10, most preferably n+m is 10 to 3000 or n and m are chosen such that the molecular weight of the compound of formula (I) is about 14,000 to 84,000, g/mol, more preferably 30,000 to 65,000 g/mol, most preferably 40,000 to 60,000 g/mol.

In preferred embodiments $R^1$ to $R^6$ in formula (I) are methyl groups and X is hydroxyl. In further preferred embodiments $R^1$ to $R^6$ are methyl groups, X is hydroxyl and n and m are chosen such that the number molecular weight of the compound of formula (I) is about 14,000 to 84,000 g/mol, more preferably 30,000 to 65,000 g/mol, most preferably 40,000 to 60,000 g/mol.

Exemplary substituted and unsubstituted alkyl groups, vinyl groups and aryl groups which can be employed in formula (I) are as stated below for formula (II).

The thermoplastic composition can optionally comprise at least one stabilizing agent, which is further added in step 2a).

The stabilizing agent according to the present invention is preferably selected from functional diorganopolysiloxanes having at least one functional group selected from epoxy, anhydride, silanol, carboxyl, amine, oxazoline or alkoxy or combinations thereof. The functional diorganopolysiloxane has preferably a number average molecular weight of at least 700, preferably 700 to 60,000, more preferably from 800 to 30,000 g/mol.

Examples of stabilizing agents according to the present invention include epoxy functional polydimethylsiloxanes, such as mono (2,3-epoxy)propylether terminated polydimethylsiloxane, epoxypropoxypropyl terminated polydimethylsiloxane, (epoxycyclohexylethyl)methylsiloxane dimethylsiloxane copolymers, and (epoxypropoxypropyl) methylsiloxane dimethylsiloxane copolymers; amine functional siloxanes, such as aminopropyl terminated polydimethylsiloxane, aminoethylaminopropyl terminated polydimethylsiloxane, aminopropyl grafted polydimethylsiloxane, aminoethylaminopropyl grafted polydimethylsiloxane; polydimethylsiloxanes containing anhydride groups, such as succinic anhydride terminated polydimethylsiloxane and succinic anhydride grafted polydimethylsiloxane; silanol terminated polydimethylsiloxanes; polydimethylsiloxanes containing carboxyl groups, such as (mono)carboxydecyl terminated polydimethylsiloxane and carboxydecyl terminated polydimethylsiloxane; and polydimethylsiloxanes containing oxazoline groups, such as vinyloxazoline grafted polydimethylsiloxane.

In most preferred embodiments the stabilizing agent is an amino functional siloxane which has the formula (II):

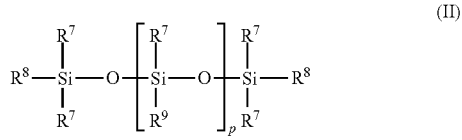
(II)

wherein each $R^7$ is independently selected from substituted or unsubstituted C1 to C6 alkyl and aryl groups, preferably from unsubstituted C1 to C6 alkyl groups, more preferably from methyl or propyl, most preferably $R^7$ is methyl;
each $R^8$ is independently selected from hydroxyl groups, alkyl, aryl vinyl and phenyl groups, preferably hydroxyl or C1 to C6 alkyl groups, most preferably $R^8$ is hydroxyl; and p is an integer from 100 to 2,000 or is selected so that the compound of formula (II) has a number average molecular weight of 400 to 20,000 g/mol, preferably 600 to 10,000 g/mol, more preferably 1,000 to 7,500 g/mol;
and $R^9$ is independently selected from $-R^{10}-NH-R^{11}$, C1 to C6 alkyl or H, with the proviso that at least one $-R^{10}-NH-R^{11}$ is present, preferably that the at least one $-R^{10}-NH-R^{11}$ is an amino propyl radical, more preferably 5 to 30, more preferably 7 to 15 $-R^{10}-NH-R^{11}$ are present which are most preferably amino propyl radical;
$R^{10}$ is independently selected from C1 to C6 alkyl or C1 to C6 alkoxy, preferably $R^{10}$ is independently selected from C1 to C6 alkyl;
and $R^{11}$ is independently selected from the group of hydrogen, aminoalkyl, aminoalkenyl, aminoaryl, and aminocycloalkyl groups, preferably $R^{11}$ is hydrogen.

As used herein, the term "independently selected" indicates that each R group of the molecule can be identical or different. For example, each $R^9$ in the compound of formula (II) may be different for each of the p $[R^7-SiR^9-O]$ units. Preferably three different kinds of $[R^7-SiR^9-O]$ units, more preferably two different kinds of $[R^7-SiR^9-O]$ units are present.

As used herein, the term "alkyl", alone or in combination, means straight and branched chained saturated hydrocarbon groups which can be substituted, containing from 1 to 10 carbon atoms, preferably from 1 to 8 carbon atoms, more preferably 1 to 6 carbon atoms. Examples of such radicals include methyl, ethyl, n-propyl, isopropyl, n-butyl, isobutyl, sec-butyl, tert-butyl, 2-methylbutyl, pentyl, iso-amyl, hexyl, 3-methylpentyl, octyl, 2-ethylhexyl and the like. Preferred substituents are F and phenyl. In more preferred embodiments "alkyl" is not substituted.

As used herein, the term "alkenyl", alone or in combination, defines straight and branched chained hydrocarbon groups which can be substituted containing from 2 to about 18 carbon atoms, preferably from 2 to 8 carbon atoms, more preferably 2 to 6 carbon atoms containing at least one double bond such as, for example, ethenyl, propenyl, butenyl, pentenyl, and hexenyl. Preferred substituents are F and phenyl. In more preferred embodiments "alkenyl" is not substituted.

The term "alkenylene", alone or in combination, defines bivalent straight and branched chained hydrocarbon groups containing from 2 to about 18 carbon atoms, preferably from 2 to 8 carbon atoms, more preferably 2 to 6 carbon atoms containing at least one double bond such as, for example, ethenylene, propenylene, butenylene, pentenylene, and hexenylene.

The term "alkoxy" or "alkyloxy", alone or in combination, refers to an alkyl ether group wherein the term alkyl is as defined above. Preferred alkyl ether groups include methoxy, ethoxy, n-propoxy, isopropoxy, n-butoxy, iso-butoxy, sec-butoxy, tert-butoxy, and hexanoxy.

The term "aryl", alone or in combination, refers to a cyclic, bicyclic or tricyclic aromatic group which contains from 6 to 18, preferably 6 to 10 ring carbon atoms, wherein the cyclic aromatic group can be substituted by F or phenyl and optionally can contain heteroatoms like N, S or O, with the proviso that the aryl group is aromatic. In preferred embodiments the aryl is not substituted and does not contain any heteroatoms.

The term "vinyl" refers to unsubstituted or substituted vinyl with F or phenyl. In preferred embodiments vinyl is not substituted.

The terms "aminoalkyl, aminoalkenyl, aminoaryl, and aminocycloalkyl" encompass amino groups and the alkyl groups as defined above and "alkyl".

In preferred embodiments the stabilizing agent is present in 0.1 to 15 wt.-%, more preferably in 0.3 to 10 wt.-%, most preferably in 0.5 to 5 wt.-%, based on the total weight of the thermoplastic composition. In more preferred embodiments this stabilizing agent is an amino functional siloxane, most preferred an amino functional siloxane according to formula (II).

The thermoplastic composition according to the present invention can be used in sealants, adhesives, or as rheological modifier or surface modifier.

Furthermore, the present invention relates to a hot melt adhesive comprising the thermoplastic composition according to the present invention. The hot melt adhesive can preferably additionally comprise a filler. In more preferred embodiments the hot melt adhesive additionally comprises a filler and an additive. The hot melt adhesive can be a non-reactive hot melt adhesive or additionally comprise a cross-linker and thus be a reactive hot melt adhesive.

When a cross-linker is employed in the hot melts according to the present invention to obtain a reactive hot melt, the cross-linker is preferably selected from tetraethylorthosilicate (TEOS), a polycondensate of TEOS, methyltrimethoxysilane (MTMS), vinyl-trimethoxysilane, methylvinyldimethoxysilane, dimethyldiethoxysilane, vinyltriethoxysilane, tetra-n-propylorthosilicate, vinyltris(methylethylketoxime) silane, methyltris(methylethylketoxime)silane, methyltris (methylmethylketoxime)silane, trisacetamidomethylsilane, bisacetamidodimethylsilane, tris(N-methyl-acetamido) methylsilane, bis(N-methylacetamido)dimethylsilane, (N-methylacetamido)methyldialkoxysilane, trisbenzamidomethylsilane, trispropenoxymethylsilane, alkyldialkoxyamidosilanes, alkylalkoxybisamidosilanes, (CH$_3$Si(OC$_2$H$_5$)(CH$_3$COC$_6$H$_5$)$_2$, CH$_3$Si(OC$_2$H$_5$)—(HCOC$_6$H$_5$)$_2$, methyldimethoxy(ethylmethylketoximo)silane; methylmethoxybis-(ethylmethylketoximo)silane; methyldimethoxy(acetal-doximo)silane; methyldimethoxy(methylcarbamato)silane; ethyldimethoxy(N-methyl-carbamato)silane; methyldimethoxyisopropenoxysilane; trimethoxyisopropenoxysilane; methyltri-isopropenoxysilane; methyldimethoxy(but-2-ene-2-oxy)silane; nnethyldimethoxy(1-phenylethenoxy)silane; methyldimethoxy-2(1-carboethoxypropenoxy)silane; methylmethoxydi-N-methylaminosilane; vinyldimethoxymethylaminosilane; tetra-N,N-diethylaminosilane; methyldimethoxymethylaminosilane; methyltricyclohexylaminosilane; methyldimethoxy-ethylaminosilane; dimethyldi-N,N-dimethylaminosilane; methyldimethoxyisopropylaminosilane; dimethyldi-N,N-diethylaminosilane; ethyldimethoxy(N-ethylpropionamido)silane; methyldi-methoxy(N-methylacetamido)silane; methyltris(methylacetamido) silane; ethyldimethoxy(N-methylacetamido)silane; methyltris(methylbenzamido)silane; methylmethoxybis(N-methylacetamido)silane; methyldimethoxy(caprolactamo) silane; trimethoxy(N-methylacetamido)silane; methyldimethoxyethylacetimidatosilane; methyldimethoxypropylacetimidatosilane; nnethyldimethoxy(,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane; methyldimethoxy-thioisocyanatosilane; methylmethoxydithioisocyanatosilane, tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 3-cyanopropyltrimethoxysilane, 3-cyanopropyltriethoxysilane, 3-(glycidoxy)propyltriethoxysilane, 1,2-bis(trimethoxysilyl)ethane, cyclohexylaminomethyltriethoxysilane, morpholinomethyltrimethoxysilane, 1,2 bis(triethoxysilyl)ethane methyltris (methylethylketoximo)silane, vinyltris(methylethylketoximo)silane, methyltris(acetonoximo)silane, ethyltris (acetonoximo)silane, vinyltris(acetonoximo)silane, phenyltris(acetonoximo)silane, tetrakis(methylethylketoximo)silane, methyltriacetoxysilane, ethyltriacetoxysilane, vinyltriacetoxysilane, dimethyldiacetoxysilane, methylvinyldiacetoxysilane or a combination of two or more thereof.

Examples of fillers according to the present invention are reinforcing fillers which preferably have a BET surface area of at least 30 m$^2$/g, e.g., carbon blacks, fumed silica, precipitated silica, silica gels, and silicon-aluminum mixed oxides. Alternatively said fillers can be hydrophobicized, i.e., which can be partially or completely treated with organosilanes or siloxanes to make them less hydrophilic and decrease the water content or control the viscosity and storage stability of the composition. Tradenames for such compounds are Aerosil®, HDK®, Cab-O-Sil® etc. Also according to the present invention are non-reinforcing fillers preferably having a BET surface area of less than 30 m$^2$/g, e.g., crushed and ground quartz, powders of quartz, cristobalite, diatomaceous earth, calcium silicate, zirconium silicate, graphite or clays such as kaolin, bentonite, montmorillonites (treated/untreated), zeolites, including the molecular sieves, such as sodium aluminum silicate, metal oxides, such as aluminum oxide, titanium dioxide, iron oxide, and zinc oxide and their mixed oxides, metal hydroxides, such as aluminum hydroxide, barium sulfate, calcium carbonate, gypsum, silicon nitride, silicon carbide, boron nitride, glass powder, carbon powder, and polymer powder such as acrylonitrile, polyethylene, polypropylene, polytetrafluoroethylene, and hollow glass and plastic beads. In preferred embodiments the fillers are selected from the above named compounds which comprise silicon atoms. More preferred are crushed and ground quartz, powders of quartz, cristobalite, silicate, fumed silica, precipitated silica, silica gels and zirconium silicate, most preferably the filler is a silicate. The BET surface area is determined according to DIN ISO 9277:2003-05.

The hot melt adhesive composition according to the present invention preferably comprises 20 to 80 wt.-% of the thermoplastic composition according to the present invention based on the total weight of the hot melt adhesive. In more preferred embodiments 30 to 70 wt.-%, most preferably 45 to 60 wt.-%, are contained.

The hot melt adhesive composition according to the present invention preferably comprises 20 to 60 wt.-% of the at least one filler, based on the total weight of the hot melt adhesive. In more preferred embodiments 15 to 50 wt.-%, most preferably 20 to 30 wt.-%, are contained.

It may contain other additives, which are known in the art. The term "additive" includes dyes, thixotropic agents (e.g., urea derivatives, fibrillated or pulp short fibers), color pastes and/or pigments, conductivity additives (e.g., conducting carbon blacks or lithium perchlorate), plasticizers, tackifiers, further thermoplastic polymers, which are different from the polyamide according to the invention, stabilizers, adhesion promoters, rheological additives, waxes, catalysts, moisture scavengers or any combination thereof.

The hot melt adhesive composition according to the present invention preferably comprises 0.1 to 30 wt.-% of additives, based on the total weight of the hot melt adhesive. In more preferred embodiments 1 to 25 wt.-%, most preferably 5 to 20 wt.-%, are contained. In even more preferred embodiments the additives are selected from stabilizers, adhesion promoters, plasticizers, tackifiers, thermoplastic polymers, which are different from the polyamide according to the invention, catalysts, moisture scavengers and combinations thereof.

The hot-melt adhesive compositions according to the invention may contain tackifiers, such as, e.g., resins derived from abietic acid, abietic acid esters, other rosin esters, polyterpene resins, terpene/phenolic resins, styrenated terpenes, poly-alpha-methylstyrene, alpha-methylstyrene-phenolic or aliphatic, aromatic or aromatic/aliphatic hydrocarbon resins or coumarone/indene resins. These tackifying resins may optionally contain OH groups, to improve compatibility of the different components.

The hot melt adhesive composition according to the present invention preferably comprises 0.1 to 30 wt.-% of at least one tackifier, based on the total weight of the hot melt adhesive. In more preferred embodiments 1 to 25 wt.-%, most preferably 5 to 20 wt.-%, are contained.

The hot-melt adhesive compositions according to the invention may contain further thermoplastic polymers. These are preferably selected from EVA, polyurethane polymers, rubber-type polymers, styrene copolymers, polyester copolymers, polycarbonates, acrylics, thermoplastic polyurethanes and combinations thereof.

The hot melt adhesive composition according to the present invention preferably comprises 0.1 to 30 wt.-% of at least one further thermoplastic polymer, based on the total weight of the hot melt adhesive. In more preferred embodiments 1 to 25 wt.-%, most preferably 5 to 20 wt.-%, are contained.

The hot-melt adhesive compositions according to the invention may contain plasticizers, provided that these plasticizers do not interfere with the hot melt capability of the composition—such as phthalates, benzoates, sucrose esters and sulphonamides. By way of example there may be mentioned the liquid phthalate plasticizers, plasticizers based on aromatic esters, such as, e.g., esters of benzoic acid, or also solid plasticizers such as dicyclohexyl phthalate, cyclohexane dimethanol dibenzoate and the like. Also suitable are other plasticizers such as sucrose acetate isobutyrate, ortho-/para-toluene sulphonamide or N-ethyl-ortho-toluene sulphonamide.

The hot melt adhesive composition according to the present invention preferably comprises 0.1 to 30 wt.-% of plasticizers, based on the total weight of the hot melt adhesive. In more preferred embodiments 1 to 25 wt.-%, most preferably 5 to 20 wt.-% are contained.

As stabilizers different components can be used such as antioxidants, UV stabilizers, hydrolysis stabilizers. Examples for these components are sterically hindered, phenols of high molecular weight, sulphur-containing and phosphorus-containing phenols or amines. This include sterically hindered phenols, polyfunctional phenols, thioether, substituted benzotriazoles, hindered benzophenone and/or sterically hindered amines. Examples of hydrolysis stabilizers include oligomeric and/or polymeric aliphatic or aromatic carbodiimides. Such components are commercially available and known to the skilled person.

As adhesion promoters, preferably organo-functional silanes can be used, either in monomeric, oligomeric or polymeric form. The organo-functional silanes are preferably selected from 3-glycidoxy-propyltrialkoxysilan, 3-acryloxypropyltrialkoxysilan, 3-aminopropyltrialkoxysilan, 1-aminoalkyltrialkoxysilan, α-methacryloxynnethyltrialkoxysilane, vinyltrialkoxysilane, N-aminoethyl-3-aminopropyl-methyldialkoxysilane, phenylaminopropyltrialkoxysilane, aminoalkyltrialkoxydisilane, iso-butylmethoxysilane, N(2-aminoethyl)-3-aminopropyltrialkoxysilane, methacryloxymethyl-triethoxysilane, mixtures thereof with alkoxy including preferably C1 to C4 mono-alcohols. The preferred amount used is from 0.05 to 5 wt.-%, especially from 0.1 to 2 wt.-%, based on the total weight of the hot melt adhesive composition.

The hot melt adhesive composition according to the present invention preferably comprises 0.1 to 30 wt.-% of a compound selected from stabilizer and adhesion promoters or a combination thereof, based on the total weight of the hot melt adhesive. In more preferred embodiments 1 to 25 wt.-%, most preferably 5 to 20 wt.-% are contained.

Moisture scavengers are preferably selected from vinyltrimethoxysilane, methyltrimethoxysilane, hexamethyldisilazane, paratoluene sulfonyl isocyanate (PTSI), or combinations thereof.

The hot melt adhesive composition according to the present invention preferably comprises 0.1 to 5 wt.-% of a moisture scavenger, based on the total weight of the hot melt adhesive. In more preferred embodiments 0.2 to 3 wt.-%, most preferably 0.5 to 1 wt.-% are contained.

Preferably, the catalysts according to the invention are selected from organic titanate compounds, organotin compounds, organozirconium compounds, amine compounds, organoaluminum compounds, acidic phosphate esters, reaction products from acidic phosphate esters and amine compounds, saturated or unsaturated polybasic carboxylic acids or anhydrides thereof, salts or reaction products from carboxylic acid compounds and amine compounds, and lead octylate. Exemplary tin compounds are dibutyltin dilaurate, dibutyltin maleate, dibutyltin diacetate, dioctyltin maleate, dibutyltin phthalate, stannous octoate, stannous naphthenate, stannous stearate, stannous versatate, reaction products from dibutyltin oxide and phthalate esters, chelate compounds such as dibutyltin diacetylacetonate, and dibutyltin oxide. Exemplary organic titanate compounds are titanate esters such as tetrabutyl titanate, tetrapropyl titanate, tetraisopropyl titanate and triethanolamine titanate, and chelate compounds such as titanium tetraacetylacetonate. Exemplary organoaluminum compounds are aluminum trisacetylacetonate, aluminum tris(ethyl acetoacetate), and di isopropoxyaluminum ethyl acetoacetate. Exemplary zirconium compounds are zirconium tetraisopropoxide, zirconium tetrabutoxide and zirconium tetraacetylacetonate. Exemplary amine compounds are butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, and 1,8-diazabicyclo[5.4.0]undecene-7 (DBU). Salts of these amines with carboxylic acids may also be used. As other examples, there may be mentioned low-molecular-weight polyamide resins obtained from an excess of a polyamine and a polybasic acid and reaction products from an excess of a polyamine and an epoxy compound. In addition, there may be mentioned organolead compounds such as lead octylate, organoiron compounds such as iron naphthenate, organovanadium compounds, bismuth salts such as bismuth-tris(2-ethylhexanoate) and bismuth tris (neodecanoate), and reaction products from an excess of an organic carboxylic acid and an organic amine. These accelerators may be used singly or two or more of them may be used in combination. Among these silanol condensation catalysts, organometallic compounds or combination systems comprising an organometallic compound and an amine compound are preferred from the viewpoint of curability.

The hot melt adhesive composition according to the present invention preferably comprises 0.1 to 5 wt.-% of a catalyst, based on the total weight of the hot melt adhesive. In more preferred embodiments 0.2 to 3 wt.-%, most preferably 0.5 to 1 wt.-% are contained.

EXAMPLES AND MEASUREMENT METHODS

Molecular Weight Determination

The respective siloxane compounds were analyzed for molecular weight and molar mass distribution by Gel Permeation Chromatography (GPC) under the same chromatographic condition. Test samples were dissolved in toluene and each of the prepared sample solutions was filtered through a 0.20 μm syringe filter into analysis vial. The prepared sample solutions were analyzed by liquid chromatography using a GPC separation technique using Styragel columns with toluene elution and refractive index detection at 80° C. The number average molecular weight (Mn) and weight average molecular weight (Mw) that were determined for the tested substances are based on an external calibration that was carried out with polystyrene standards.

Melt viscosity (also referred to as viscosity in the present invention) Melt viscosity was measured using a Brookfield Viscometer model RVDV-1+ with a Model 106 temperature controller and Thermosel unit, calibrated with viscosity standard oil. 10 to 12 g of adhesive was weighed into a disposable aluminum viscometer tube. The tube was inserted into the Viscometer and left to equilibrate for 30 minutes at 160° C. The preheated spindle no. 27 was inserted into the adhesive and allowed to rotate for 30 minutes at 160° C.; the speed of rotation was changed according to the viscosity range measured. The initial viscosity V1 at 160° C. was then measured.

Tensile Strength

The tensile strength was determined according to ASTM D412/DIN 53504/ISO 37, using a Galdabini dynamometer model Sun 5 equipped with a load cell of 5 kN. During the test, the machine maintains a displacement rate of 500 mm/min. The machine recorded the highest tensile stress to determine the tensile strength.

Hardness

The hardness was determined according to ASTM D2240/DIN53505/ISO868/ISO 2783, using an ATSfaar durometer equipped with a system to measure shore type A. The product is cured for 7 days at 25° C./50% HR to prepare a 2 mm thickness sheet. The measurement is made using 2 pieces to obtain 6 mm thickness.

Lap Shear (Substrates: Al—Al and Stainless Steel-Stainless Steel)

This was determined according to ASTM D1002-05/ASTM D3163/ISO 4587/DIN EN 1465, using a Galdabini Dynamometer model Sun 5 equipped with a loac cell of 5 kN. The specimen is prepared assembling two pieces of substrate with an overlap of 12.7 mm×25.4 mm. The gap is of 1 mm. The product is cured 7 days at 25° C./50% HR before testing.

Softening Point

The softening point was determined using a PAC ring and ball instrument model HRB 754. The softening point is defined as the temperature at which a disk of the sample held within a horizontal ring is forced downward a predefined distance under the weight of a steel ball as the sample is heated at a prescribed rate in oil bath. The test is performed on 1.6 grams of product with a metallic ball of 3.5 grams.

Preparation of the Thermoplastic Composition

Method A1

The polyamide was melted and heated above its melting point in a flask in an inert atmosphere (nitrogen gas). Then the liquid siloxane compound was gradually added under stirring (about 200 rpm) while the temperature of the mixture was maintained above the melting point of the polyamide. The mixtures were mixed for 30 minutes to 1 hour (at about 2400 to 2800 rpm) above the melting point of the polyamide and subsequently discharged. After cooling a solid thermoplastic composition was obtained.

Method A2 (Comparative Method)

The polyamide, liquid polysiloxane compound and the stabilizing agent were placed together in a flask and heated above the melting point of the polyamide in an inert atmosphere (nitrogen gas) under stirring for 30 minutes to 1 hour (at about 2400 to 2800 rpm). After cooling a liquid composition was obtained.

Preparation of the Hot Melt Adhesive

Method B

A mixer was charged with the thermoplastic composition obtained in method A1 and heated to a temperature at which the thermoplastic mixture was liquid. Subsequently the filler was added. Then the mixture was brought to a temperature of 105 to 120° C. and dynamic vacuum was applied for about 2 hours. The mixture was allowed to cool to 60° C. and optionally additives and further constituents of the composition were added. Finally the mixture was stirred while dynamic vacuum was applied for about 20 minutes and a hot melt adhesive was obtained.

If a reactive hot melt was intended the mixture was allowed to cool to 75 to 85° C. and the cross-linker was added and dynamic vacuum was applied for about 1 hour after dynamic vacuum step for 2 hours and before the cooling to 60° C.

Example 1

The thermoplastic composition was prepared according to method A1.

Composition:
40 wt.-% polyamide (Technomelt PA 6730, having a melting point of about 85° C.)
57.5 wt.-% liquid polysiloxane (viscosity 20,000 mPas at 25° C.; OH terminated)
2.5 wt.-% amino functional siloxane (Hansa AS 8020 from CHT)

Example 2

The thermoplastic composition was prepared according to method A1.

Composition:
40 wt.-% polyamide (Technomelt PA 6730, having a melting point of about 85° C.)
57.5 wt.-% liquid polysiloxane (viscosity 20,000 mPas at 25° C.; OH terminated)
2.5 wt.-% amino functional siloxane (Hansa ASR 7020 from CHT)

Example 3

The thermoplastic composition was prepared according to method A1.

Composition:
30 wt.-% polyamide (Technomelt PA 2006, having a melting point of about 110° C.)
67.5 wt.-% liquid polysiloxane (viscosity 3,500 mPas at 25° C.; OH terminated)
2.5 wt.-% amino functional siloxane (Hansa AS 7020 from CHT)

Example 4

The thermoplastic composition was prepared according to method A1.

Composition:
40 wt.-% polyamide (Technomelt PA 6730, having a melting point of about 85° C.)
57.5 wt.-% liquid polysiloxane (viscosity 20,000 mPas at 25° C.; OH terminated)
2.5 wt.-% amino functional siloxane (Hansa ASR 7020 from CHT)

Comparative Examples 5 to 7

The comparative examples 5 to 7 were prepared in accordance with method A2. The compounds and amounts as in examples 1 to 4 were employed. In comparative examples 5 to 7 solely liquids were obtained which did not show any thermoplastic properties.

Example 8

The hot melt adhesive was prepared according to method B.
50 wt.-% of the thermoplastic composition according to Example 2
6.1 wt.-% CH3 terminated polydimethylsiloxane (viscosity 1,000 mPas at 25° C.)
33.1 wt.-% Silbond 8000TST (filler)
5 wt.-% Aerosil R974 (treated silica; filler)
1 wt.-% Raven 1020 (carbon black)
2.95 wt.-% LM 400 (cross-linker)
1.65 wt.-% Silane A 1110 (adhesion promoter)
0.2 wt.-% Formrez UL 28 (catalyst)
0.1 wt.-% Hexamethyldisilazane (moisture-scavenger)

The obtained hot melt showed the following properties:
Extrusion at 6.2 bar and 95° C.: 34.61 (g/min)
Tensile strength: 1.62 (g/min)
Elongation at break: 230%
Hardness (Shore A): 45
Lap shear (aluminum): 1.167 N/mm$^2$
Lap shear (stainless steel): 1.15 N/mm$^2$

The invention claimed is:

1. A solid at room temperature thermoplastic composition prepared from components comprising at least one polyamide having a melting point of less than 185° C., and at least one liquid, OH terminated polysiloxane compound which has a viscosity of 750 to 100,000 mPas at 25° C.

2. A solid at room temperature thermoplastic composition prepared from components comprising at least one polyamide having a melting point of less than 185° C., and at least one liquid, OH terminated polysiloxane compound which has a viscosity of 750 to 100,000 mPas at 25° C., wherein the solid thermoplastic composition is obtained by a process comprising:
   1a) heating the at least one polyamide to a temperature above the melting point of the at least one polyamide and below 185° C.;
   2a) adding under stirring the at least one liquid polysiloxane compound to the heated compound(s) of step 1a), wherein the temperature is kept above the melting point of the at least one polyamide and below 185° C.; and
   3a) mixing the obtained mixture of step 2a) at 80° to 180° C.

3. The thermoplastic composition according to claim 2, wherein in step 2a) at least one stabilizing agent is further added.

4. The thermoplastic composition according to claim 2, wherein the at least one polyamide is present in 25 to 70 wt.-%, based on the total weight of the thermoplastic composition.

5. The thermoplastic composition according to claim 2, wherein in step 2a) 0.1 to 15 wt.-%, based on the total weight of the thermoplastic composition of at least one stabilizing agent is further added and the stabilizing agent is an amino functional siloxane, different from the at least one liquid polysiloxane.

6. A sealant, adhesive, rheological modifier or surface modifier comprising the thermoplastic composition according to claim 2.

7. A hot melt adhesive comprising the thermoplastic composition according to claim 2.

8. The hot melt adhesive according to claim 7, comprising a filler and optionally comprises an additive.

9. The hot melt adhesive according to claim 7, comprising a cross-linker.

10. The hot melt adhesive according to claim 7, comprising a cross-linker selected from methyltris(dimethylketoxime)silane, vinyltris(methylethylketoxime)silane, methyltris(methylethylketoxime)silane and combinations thereof.

11. The hot melt adhesive according to claim 7, comprising the thermoplastic composition according to claim 2 in an amount of 20 to 80 wt.-%, based on the total weight of the hot melt adhesive.

12. The hot melt adhesive according to claim 7, comprising filler in an amount of 10 to 60 wt.-%, based on the total weight of the hot melt adhesive.

13. The hot melt adhesive according to claim 7, comprising silicate filler.

14. The hot melt adhesive according to claim 7, comprising at least one additive selected from the group consisting of adhesion promoter, stabilizer, tackifier, further thermoplastic polymer, plasticizer, catalyst, moisture scavenger and combinations thereof.

15. The hot melt adhesive according to claim 14, wherein the at least one additive is present from 0.1 to 30 wt.-%, based on the total weight of the hot melt adhesive.

16. An article comprising the hot melt adhesive according to claim 7.

17. The article of claim 16 selected from a vehicle part, a construction, a window, glazing, a sanitary application, a fitting, roofing, plumbing, an appliance and glass panes.

* * * * *

UNITED STATES PATENT AND TRADEMARK OFFICE
CERTIFICATE OF CORRECTION

PATENT NO. : 10,160,859 B2
APPLICATION NO. : 15/613782
DATED : December 25, 2018
INVENTOR(S) : Sebastien Lanau et al.

Page 1 of 1

It is certified that error appears in the above-identified patent and that said Letters Patent is hereby corrected as shown below:

In the Specification

Column 7, Line 33: Change "nnethyldimethoxy(1-phenylethenoxy)silane" to -- methyldimethoxy(1-phenylethenoxy)silane --.

Column 7, Line 49: Change "nnethyldimethoxy(,N',N'-trimethylureido)silane" to -- methyldimethoxy(,N',N'-trimethylureido)silane --.

Column 9, Line 58: Change "α-methacryloxynnethyltrialkoxysilane" to -- α-methacryloxymethyltrialkoxysilane --.

Signed and Sealed this
Twenty-second Day of October, 2019

Andrei Iancu
*Director of the United States Patent and Trademark Office*